Nov. 23, 1954   B. A. ANDREWS ET AL   2,695,001
SOUND GENERATOR AND TRANSMITTER FOR DOOR CONTROLLING MECHANISM
Original Filed March 24, 1947
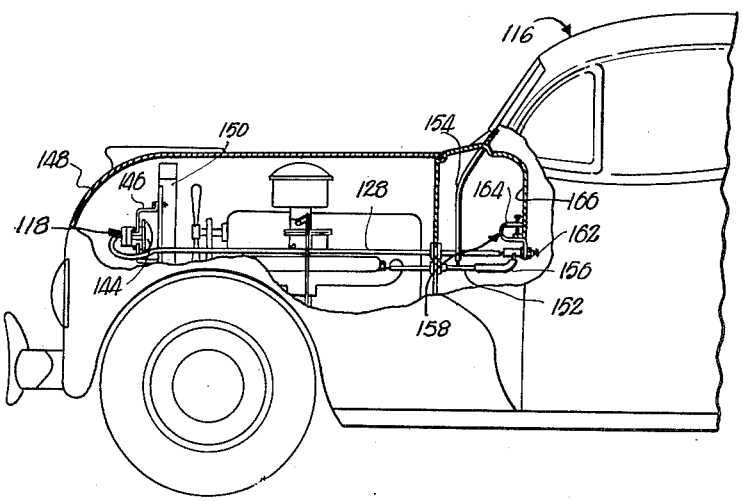
Fig. 1.
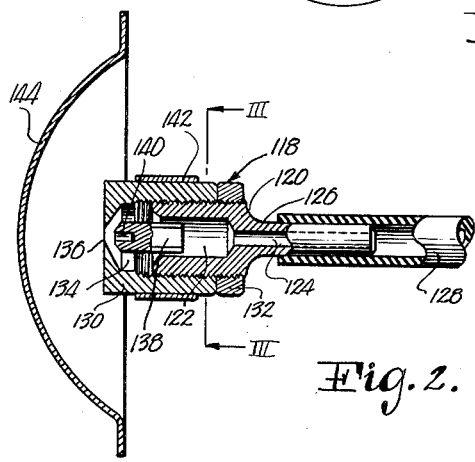
Fig. 2.
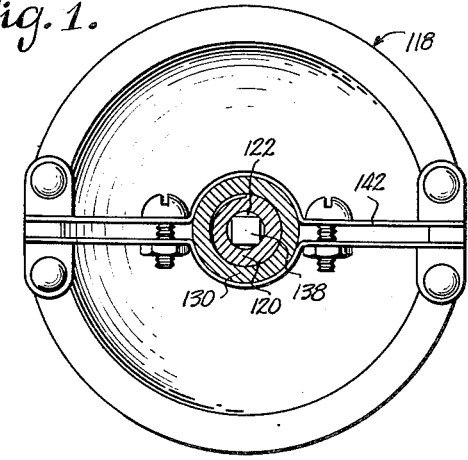
Fig. 3.
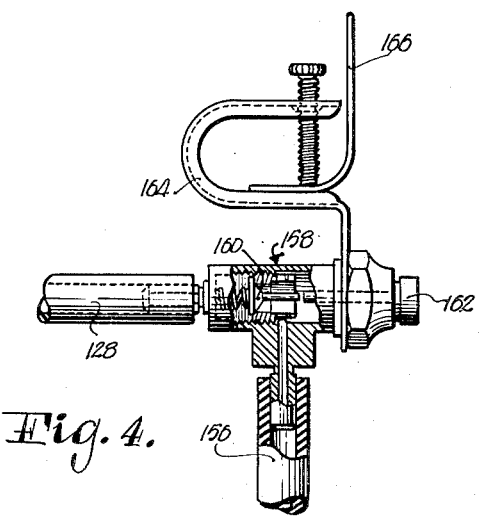
Fig. 4.
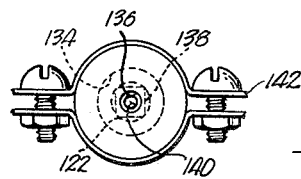
Fig. 5.
INVENTOR.
Boley A. Andrews
George M. Pro
BY
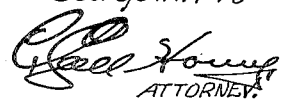
ATTORNEY.

United States Patent Office 2,695,001
Patented Nov. 23, 1954

2,695,001

SOUND GENERATOR AND TRANSMITTER FOR DOOR CONTROLLING MECHANISM

Boley A. Andrews, Kansas City, Kans., and George M. Pro, Kansas City, Mo., assignors to The Vendo Company, Kansas City, Mo., a corporation of Missouri Original application March 24, 1947, Serial No. 736,684. Divided and this application August 13, 1951, Serial No. 241,548

4 Claims. (Cl. 116—137)

This invention relates to a system for remotely controlling the operation of movable structure and more particularly to a control unit for garage doors or the like, the primary object being to provide a system having a generator and transmitter mounted upon and operable by an automobile or the like for creating and sending supersonic sound waves, and operable in connection with an electronic relay control unit for receiving such supersonic sound waves and with actuating mechanism for the garage door operable by said control unit.

This is a division of our co-pending application, Serial No. 736,684, filed March 24, 1947, entitled "Door Controlling Mechanism and Limit Switch," and wherein is disclosed one type of garage door actuating mechanism with which the generator and transmitter hereof is adapted to be used. Our co-pending application filed on even date herewith, and entitled "Electronic Control Unit for Door Controlling Mechanism," also a division of said application, Serial No. 736,684, relates to structure responsive to the generator and transmitter hereof and operable to control the aforesaid door actuating mechanism.

The most important object hereof is to provide an instrument capable of producing sound waves having vibrations whose frequencies do not affect the normal human ear and operable by the vacuum system of an automobile.

A further important object of this invention is to provide a generator and transmitter of supersonic sound waves adapted for mounting upon and operation by the vacuum line of an automobile and constituting a sectional body having a continuous bore through one of the sections provided with a sound orifice at the mouth thereof and a plug having a cavity in coaxial alignment with the sound orifice for creating the supersonic waves upon creation of a suction within a bore by the automobile vacuume line, thereby drawing air into the sound orifice and cavity.

Many additional objects of this invention will be made clear or become apparent during the course of the following specification, reference being had to the accompanying drawing, wherein:

Figure 1 is a fragmentary, side elevational view of an automobile, parts being broken away to illustrate the manner of mounting the supersonic sound generator and transmitter hereof.

Fig. 2 is a substantially, central, longitudinal, cross-sectional view through the vacuum operated whistle per se.

Fig. 3 is a cross-sectional view taken on line XI—XI of Fig. 10.

Fig. 4 is an enlarged, side elevational view of the manually operable vacuum control valve showing the manner of mounting the same upon the automobile dash-board, parts being broken away for clearness; and Fig. 5 is an end elevational view of the vacuum operated whistle showing the same with the reflector entirely removed.

As above indicated, our application Serial No. 736,684, discloses a garage door actuating assembly that is adapted for operation through use of a reversible electric motor, and while the present invention is adaptable for use in connection therewith, other door controls may be substituted.

Reference is had to a co-pending application, Serial No. 61,473, filed November 22, 1948, entitled "Motor Actuated Door Operator"; and a co-pending application filed on even date herewith, entitled "Door Operating Mechanism Having Motor Actuator," both in the name of Boley A. Andrews.

Our aforesaid co-pending application entitled "Electronic Control Unit for Door Controlling Mechanism" relates to equipment for receiving the sound waves from the generator hereof and converting the same to energy capable of controlling the electric motor of the system. Patent No. 2,558,032, dated June 26, 1951, and a co-pending application entitled "Electric Motor Circuit for Door Controlling Mechanism," both in the name of Boley A. Andrews, disclose electric circuits for interconnecting the electronic conversion unit and the motor, all of the aforesaid applications, said patent and the present application having a common assignee.

The supersonic generator hereof is designed to be mounted upon and operated by an automobile 116, and includes a vacuum operated whistle broadly designated by the numeral 118.

The whistle 118 comprises a hollow, sectional body. An innermost section 120 having a neck portion 126 for telescopically receiving a tube 128 is provided with a continuous bore 122 therethrough, bore 122 being preferably circular in cross-section and of reduced diameter as at 124 within neck portion 126. That portion of section 120 having the enlarged portion of bore 122 therein is externally threaded to receive internal threads of an outer section 130 and a lock ring 132 threaded on section 120 holds section 130 in place.

The threads of section 130 are formed in a bore 134 provided in outer section 130, the latter having a sound orifice 136 disposed substantially coaxially with bore 122 of section 120. A plug 138 is polygonal in cross-section as shown in Fig. 3 and press-fitted in bore 122. One end of plug 138 extends outwardly from bore 122 into bore 134, and a resonant cavity 140 is formed in this end of plug 138 in coaxial relationship to the sound orifice 136. The diameter of cavity 140 is less than the diameter of orifice 136 and the mouth thereof is spaced from orifice 136.

A bracket 142 circumscribes the section 130 of the body forming whistle 118 to mount a reflector 144 circumscribing and extending outwardly from orifice 136, and serving as a means to receive a suitable clamp 146. This clamp 146 mounts the whistle 118 on automobile 116, preferably between grill 148 and radiator 150 of automobile 116.

Any suitable means may be utilized for connecting whistle 118 into the vacuum line of automobile 116. In the instance shown, a T-pipe 152 is interposed in the windshield wiper vacuum supply conduit 154 and a hose or the like 156 used to join T-pipe 152 and a suitable valve 158. This valve 158 may be of conventional character, having connection with the tube 128 leading to whistle 118, and being provided with a spring-loaded valve stem 160. This valve stem 160 normally closes the passage between tubes 128 and hose 156, and is actuated by a manually controlled plunger 162. A clamp 164 mounts valve 158 to the dash-board 166 of automobile 116.

The wave length at which whistle 118 will generate a supersonic sound, corresponds closely to the natural frequency of the cavity 140. For best results, the depth of cavity 140 should not exceed twice its diameter.

In operation, when a vacuum is created by the engine of automobile 116, valve 158 is opened to cause air to be drawn into bore 134 of section 130 through orifice 136. The resultant jet of air flowing into orifice 136 is projected into the mouth of the cavity 140.

It has been found that this type of whistle may be constructed to operate from a frequency as low as 5000 C. P. S. to as high as 45,000 C. P. S., and most satisfactory results for operation of the control unit, hereinafter fully set forth, are obtained on frequencies above 20,000 C. P. S.

The whistle 118 will operate on automobiles having vacuum readings ranging from 15 to 19 inches. Simultaneous operation of the windshield wiper ordinarily will have no effect upon the operation of the whistle 118.

Another consideration is change in frequency when the whistle 118 is subjected to fluctuating ambient temperatures. This is caused by the fact that velocity of sound in air changes with temperature. The increase in velocity per degree centigrade temperature rise is approximately 2 feet per second. It is necessary therefore, to provide a band width of frequency response in order to obtain satisfactory operation during atmospheric temperature changes.

The principle involved in the operation of the whistle 118 is that of creating vibrational energy within the cavity 140 that is carried to the microphone 115 through the air. Many factors must be considered in arriving at a predetermined frequency such as the velocity of the sound in the air at given temperatures, distance between whistle 102 and a receiving microphone, amplitude of the vibrations, etc.

Vibrations are created within cavity 140 the moment air enters and strikes the bottom wall thereof. A momentary resistance to the air entering orifice 136 is created and a "bouncing" of the air in cavity 140 creates the vibrations. Obviously, the vibration number is within the higher pitch limit, inaudible to the human ear.

Many adjustments are provided in whistle 118 to the end that a given frequency may be established by adjustment and tests, thereby eliminating complicated calculations. The plug 138 may be shifted within the bore 122 to move the mouth of cavity 140 toward or from orifice 136. Cavity 140 and/or the orifice 136 may be drilled to different diameters to vary frequency. Cavity 140 may be changed with respect to the depth thereof into plug 138. And, section 130 and lock ring 132 are shiftable on section 120 to vary the distance between orifice 136 and cavity 140. Figures 2 and 3 clearly show the manner in which air is drawn into orifice 136, bore 134, around plug 138, into bore 122, reduced portion 124 of bore 122, and finally into tube 128.

The reflector 144 serves a two-fold purpose. First, the supersonic wave is concentrated directly forward of automobile 116 through grill-work 148. Secondly, whistle 118 is protected from the elements as well as foreign objects which might otherwise obstruct sound orifice 136 and render whistle 118 inoperative.

Having thus described the invention what is claimed as new and desired to be secured by Letters Patent is:

1. Suction operated, air-whistle-type, sound-wave generating apparatus for use with a vacuum line, said apparatus comprising a hollow body provided with an internal chamber and a pair of openings in the external surface of the body in communication with said chamber, the body being adapted for receiving a vacuum line in communicating relationship with one of said openings, the other of said openings being in direct communication with the atmosphere, of entirely open cross-section and of smaller cross-sectional area than the adjacent portion of said chamber to present a combination air ingress and sound-wave egress orifice for said chamber; an element having an open mouthed, closed bottom, predeterminedly dimensioned cavity of elongated depth penetrating thereinto, the mouth of said cavity having its transverse dimensions smaller than the corresponding dimensions of said orifice; and means mounting the element entirely within said chamber with said cavity disposed in spaced, facing relationship to said orifice and with the central, longitudinal axis of said cavity in substantial alignment with the central normal axis of said orifice, the cross-sectional areas of said element in planes normal to the longitudinal axis of said cavity being smaller than the cross-sectional areas of said chamber in corresponding planes.

2. Apparatus as set forth in claim 1, wherein said mounting means is adjustable and includes parts accessible externally of said body for selectively varying the spacing of the mouth of said cavity from said orifice.

3. Apparatus as set forth in claim 1, wherein is provided directional, sound-wave radiating means comprising a reflector mounted externally of said body and having a concave face disposed in predeterminedly spaced, facing relationship to said orifice, said face being of greater transverse dimensions than said body.

4. Suction operated, air-whistle-type, sound-wave generating and directionally radiating apparatus for use with a vacuum line, said apparatus comprising a pair of sections each having an end wall, a side wall defining a hollow, substantially cylindrical interior, and an open end opposite the end wall, one of said sections being telescoped and adjustably, threadably mounted within the other of said sections with the axes of revolution of said interiors in alignment and the end walls of the sections disposed in remote opposition to present a hollow body having an elongated, internal chamber of circular, transverse, cross-section and adjustably variable length, said one section being provided with an opening in its end wall and adapted to receive a vacuum line in communicating relationship with said opening and said chamber, said other section being provided with a circular perforation in its end wall, said perforation being of lesser diameter than the adjacent portion of said chamber and disposed with its central, normal axis in alignment with the axes of revolution of said interiors to present a combination air ingress and sound-wave egress orifice for said chamber; an elongated, plug-like element having a portion adjacent one end thereof of polygonal, transverse, cross-section presenting a number of pairs of angularly intersecting, lateral faces on said portion, the zones of juncture of said pairs of intersecting faces being in tight-fitting engagement with the side wall of said one section for rigidly mounting said portion of the element within the interior of said one section for movement of the element with said one section when the latter is adjusted, the remainder of said lateral faces being spaced from the side wall of said one section, said one end of the element being spaced from the end wall of said one section, a second portion of said element including the other end thereof being disposed within the interior of said other section in spaced relationship to the walls of the latter, said other end of the element being provided with a cylindrical, open mouthed, closed bottom cavity of predetermined dimensions having its mouth in facing relationship to said orifice, the axis of revolution of said cavity being substantially aligned with the central, normal axis of said orifice, the diameter of said cavity being smaller than the diameter of said orifice; and a sound-wave reflector mounted externally of the body and having a concave face disposed in predeterminedly spaced, facing relationship to said orifice, said face being of greater transverse dimensions than said body.

References Cited in the file of this patent

UNITED STATES PATENTS

| Number | Name | Date |
|---|---|---|
| 961,158 | Pierson | June 14, 1910 |
| 1,838,081 | Aufiero | Dec. 29, 1931 |
| 1,869,142 | Gillet | July 26, 1932 |
| 1,964,284 | Gillet | June 26, 1934 |
| 1,973,673 | Rice | Sept. 11, 1934 |
| 2,083,164 | Hanna | June 8, 1937 |
| 2,238,668 | Wellenstein | Apr. 15, 1941 |